United States Patent
Moffitt

(10) Patent No.: US 9,319,903 B1
(45) Date of Patent: Apr. 19, 2016

(54) MESH WIRELESS NETWORK FOR AGRICULTURAL ENVIRONMENT

(71) Applicant: William Stanley Moffitt, San Jose, CA (US)

(72) Inventor: William Stanley Moffitt, San Jose, CA (US)

(73) Assignee: Ayrstone Productivity LLC, North Oaks, MN (US)

( * ) Notice: Subject to any disclaimer, the term of this patent is extended or adjusted under 35 U.S.C. 154(b) by 0 days.

(21) Appl. No.: 14/677,077

(22) Filed: Apr. 2, 2015

Related U.S. Application Data

(60) Provisional application No. 61/974,138, filed on Apr. 2, 2014.

(51) Int. Cl.
*H04W 4/00* (2009.01)
*H04W 24/02* (2009.01)
*H04W 84/12* (2009.01)

(52) U.S. Cl.
CPC .............. *H04W 24/02* (2013.01); *H04W 84/12* (2013.01)

(58) Field of Classification Search
CPC ..... H04W 24/00; H04W 24/02; H04W 24/04; H04W 84/00; H04W 84/02; H04W 84/12
See application file for complete search history.

(56) References Cited

U.S. PATENT DOCUMENTS

| | | | |
|---|---|---|---|
| 4,183,413 A * | 1/1980 | Boston | A01B 39/16 172/646 |
| 7,822,802 B2 | 10/2010 | Chen et al. | |
| 8,193,929 B1 | 6/2012 | Siu et al. | |
| 8,558,695 B2 * | 10/2013 | Bastide et al. | 340/540 |
| 2009/0281672 A1 * | 11/2009 | Pourzia | A01G 25/167 700/284 |
| 2011/0280154 A1 * | 11/2011 | Silverstrim | G08B 21/12 370/254 |
| 2013/0226357 A1 * | 8/2013 | Ersavas et al. | 700/284 |
| 2013/0265909 A1 * | 10/2013 | Park | H04L 45/26 370/255 |
| 2014/0024313 A1 | 1/2014 | Campbell | |

\* cited by examiner

*Primary Examiner* — Anh Ngoc Nguyen
(74) *Attorney, Agent, or Firm* — Lee-Ann Smith-Freeman

(57) ABSTRACT

A network for monitoring and controlling agricultural operations employs a wireless mesh network to provide feedback related to an agricultural field located remotely from a computer system/server. In some embodiments, the wireless mesh network may employ for example, the IEEE 802.11s and 802.11n standard to communicate data from a sensor in the agricultural field to and between remote access points in the mesh network.

20 Claims, 2 Drawing Sheets

MESH WIRELESS NETWORK FOR AGRICULTURAL ENVIRONMENT

CROSS-REFERENCE TO RELATED APPLICATIONS

This application claims benefit under 35 U.S.C. §119(e) of U.S. Provisional Application having Ser. No. 61/974,138 filed Apr. 2, 2014, which is hereby incorporated by reference herein in its entirety.

BACKGROUND

The embodiments herein relate generally to agricultural systems, and more particularly, to a mesh wireless network for agricultural environments.

Profitability in production farming depends on making correct and timely operational decisions based on current conditions and historical information. However, there is currently no single way to collect all the necessary data on a farm to facilitate those decisions and take the necessary actions.

Numerous wireless mesh networking systems exist. However, the most common IEEE standard 802.15.4 (e.g. "Zigbee") networks do not have the range to be effective for large farms. Sensors that provide point-to-point radio links do not scale well because they require a "headquarters" radio for every radio in the field and typically have very low bandwidth.

For a grower with 20 or more fields spread out over 10 linear miles or more, this is untenable.

As can be seen there is a need for a network that can provide data in modern large farm environments.

SUMMARY

According to one embodiment of the subject technology, a network for monitoring and controlling agricultural operations comprises a server, a router, a gateway access point, a plurality of remote access points coupled to the gateway access point and connected to one another in a wireless mesh, and at least one sensor connected to a first of the plurality of remote access points. The sensor may be disposed to provide feedback data related to an agricultural field located remotely from the server. The feedback data is provided through a wireless mesh networking specification standard.

According to another embodiment of the subject technology a network for monitoring and controlling agricultural operations comprises a server, a router, a gateway access point, a plurality of remote access points coupled to the gateway access point and connected to one another in a wireless mesh under the IEEE 802.11s standard, a web browser interface connectable to the first of the plurality of remote access points, and at least one wireless sensor connected to the first of the plurality of remote access points. The sensor is disposed to provide feedback data related to an agricultural field located remotely from the server. The feedback data may be provided back to the web browser through the wireless mesh under the IEEE 802.11s standard.

BRIEF DESCRIPTION OF THE FIGURES

The detailed description of some embodiments of the present invention is made below with reference to the accompanying figures, wherein like numerals represent corresponding parts of the figures.

DETAILED DESCRIPTION OF CERTAIN EMBODIMENTS

Broadly embodiments of the subject technology provide a wireless mesh network configured to operate over large farm areas. The wireless mesh network allows communication from potentially any point among a farm's many fields without the physical restrictions of hard wiring or bandwidth restrictions of localized radio points. Some embodiments provide network and internet access via WiFi from the field, which allows the grower to access both his farm's data and, potentially, the Internet from his fields at any time. A farm-wide network is achieved so that data can be automatically collected from fixed and mobile data sources (for example, sensors, sensor networks, IP cameras, in-cab planting, spraying, and harvesting computers, etc.) and actions can be taken by remotely controlling farming equipment (for example, pumps, irrigation systems, heating systems, ventilation systems, cooling systems, grain dryers, unmanned, self-driving farm vehicles, etc.).

Figure 1:
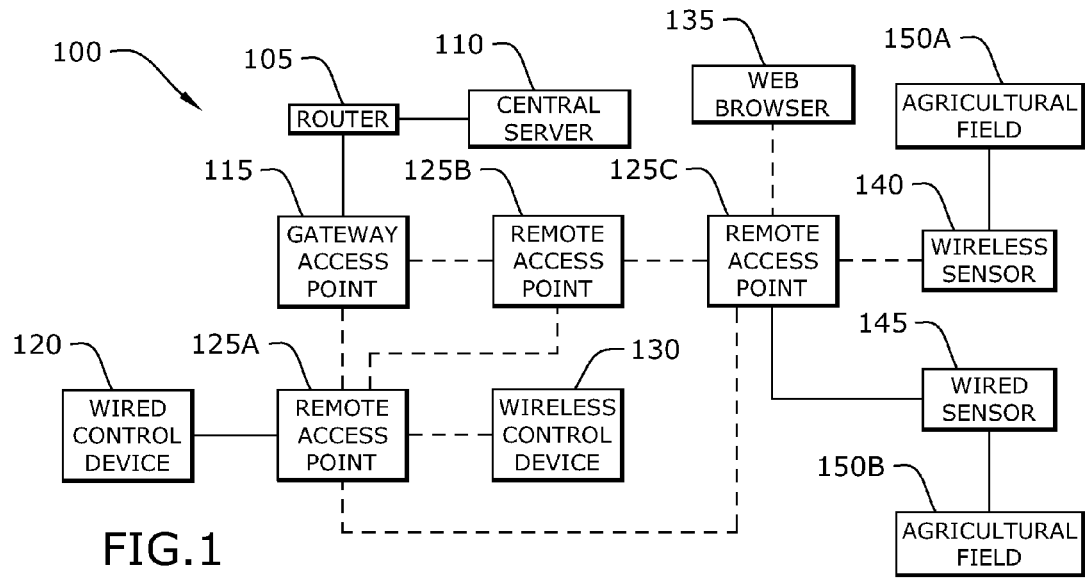
FIG. 1 is a block diagram of a mesh network according to an exemplary embodiment of the subject technology.
Figure 2:
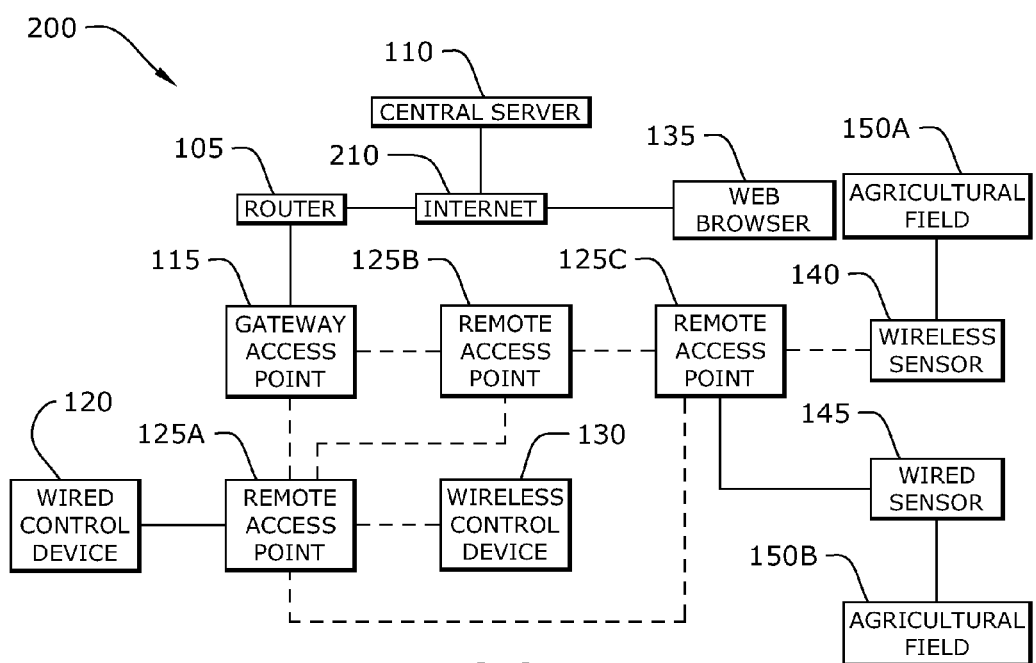
FIG. 2 is a block diagram of a mesh network according to another exemplary embodiment of the subject technology.

Referring now to FIGS. 1 and 2, a network 100 (FIG. 1) (or 200 as shown in FIG. 2) for monitoring and controlling agricultural operations is shown according to exemplary embodiments of the subject technology. The network 100 includes a router 105 connected to a computer system/server 110. The computer system/server 110 may exist on the local network (as shown in FIG. 1) or may be located externally and connected to the local network via the Internet 210 (as shown in FIG. 2). The computer system/server 110 provides a set of network interfaces that allow remote access points 125A, 125B, and 125C (referred to collectively as access points 125) via http, https, and/or TCP/UDP formats to indicate their health status and download configuration information. The computer system/server 110 may connect to the access points 125 through the router 105 and a gateway access point 115 and can display the health information from the access points 125 (and, potentially, other information gathered from the network 100 or 200) to the farmer. The client may access the remote access points 125 through the gateway access point 115 using the IEEE 802.11a, IEEE 802.11b, IEEE 802.11g, IEEE 802.11n, or IEEE802.11ac standards. The access points 125 can use the configuration information to reconfigure themselves as needed. In an exemplary embodiment, the access points 125 may be connected to one another through a wireless mesh configuration using for example, the IEEE 802.11s specification standard. Using the IEEE 802.11s specification standard allows data to be communicated over distances sufficient to cover for example, 10 linear miles. Moreover, the network 100 (or 200) may be configured so that if one of the access points 125 fails or suffers from excessive bandwidth, data may be re-routed through another access point 125 so that real-time feedback may be accessible at all times. The remote access points 125 may sometimes be connected to a wired control device 120 or a wireless control device 130 (for example, thermostats, electrical relays, pumps, irrigation systems, GPS-based automatic driving systems, and other apparatus controllable over a standard Internet Protocol network) which may be operated based on feedback provided to the farmer through the network 100.

In an exemplary embodiment, at least one of the remote access points 125 may be connected to a sensor (140 or 145)

which is disposed to collect data related to an agricultural field (150A or 150B; referred to collectively as fields 150). The sensor (140 or 145) may be for example, temperature sensors, moisture sensors, anemometers, rainfall gauges, GPS systems, variable-rate seeding systems, variable-rate spray systems, harvest monitors, and other data collection devices For sake of illustration, only the remote access point 125C is shown connected to agricultural fields 150A (through wireless sensor 140) and 150B (through wired sensor 145). It will be understood however that remote access points 125A and 125B may also be connected to their own agricultural fields for monitoring conditions. In some embodiments, the wireless sensor 140 may provide data back through the remote access point 125C using for example, the IEEE 802.11s or 802.11n specification standards. In such a scenario, the range of the network 100 (or 200) may be further extended depending on the strength of the transmitter (not shown) connected to the wireless sensor 140. In addition, while the wired control device 120 or the wireless control device 130 are shown separate from the agricultural fields 150A and 150B, it will be understood that the devices (120 or 130) may be located proximate or in the agricultural fields 150A and 150B and may be controlled based on the feedback data provided by the sensors 140; 145.

In some embodiments, the farmer may access data related to the fields 150 through a web browser interface 135. The web browser interface 135 may be operated according to a computer program product as described more fully below. The web browser interface may provide the farmer a display of current field conditions as provided by the feedback from sensors 140; 145. In addition, the farmer may control wired control devices 120 or wireless control devices 130 through the web browser interface 135.

Figure 3:
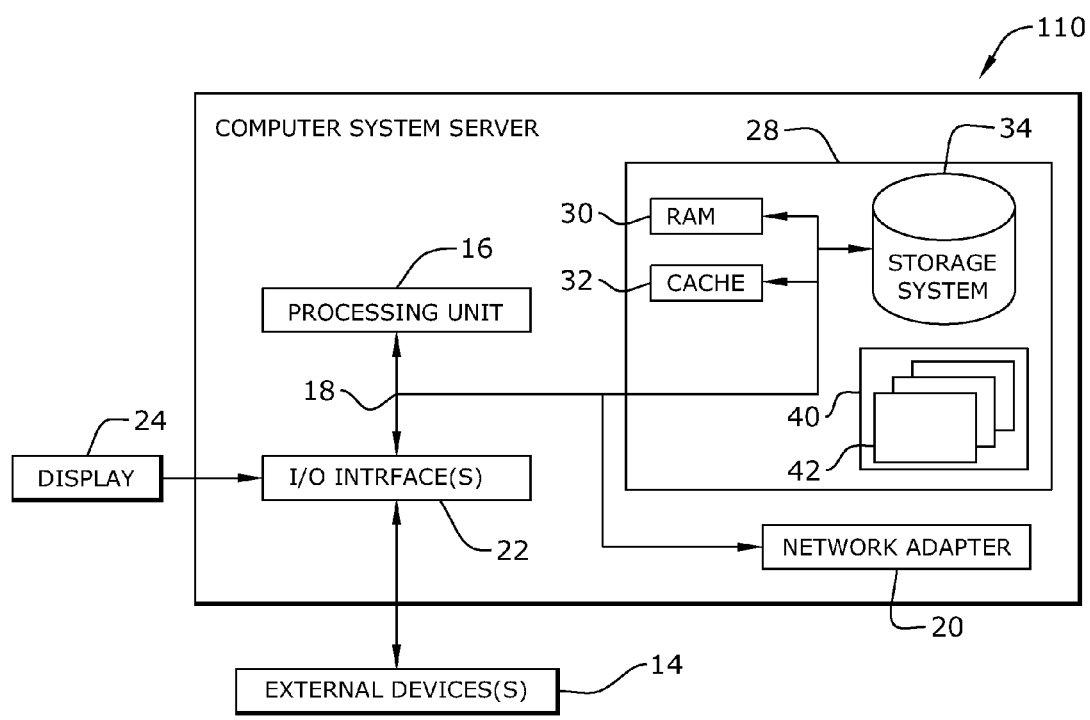
FIG. 3 is a block diagram of a general computing device according to an exemplary embodiment of the subject technology.

Referring now to FIG. 3, a schematic of an example of a computer system/server 110 is shown. The computer system/server 110 may represent the machine for identifying gaps in meeting agricultural goals, providing timely information to the grower about those gaps, and possibly even effecting automated control of devices on the farm to realize the agricultural goals. The computer system/server 110 is shown in the form of a general-purpose computing device. The components of the computer system/server 110 may include, but are not limited to, one or more processors or processing units 16, a system memory 28, and a bus 18 that couples various system components including the system memory 28 to the processor 16.

The computer system/server 110 may be for example, personal computer systems, tablet devices, handheld or laptop devices, multiprocessor systems, server computer systems, microprocessor-based systems, set top boxes, programmable consumer electronics, network PCs, smart phones, and distributed cloud computing environments that include any of the above systems or devices, and the like. The computer system/server 110 may be described in the general context of computer system executable instructions, such as program modules, being executed by a computer system (described for example, below). In addition, it will be understood that the remote access points 125 (FIGS. 1 and 2) may at least partially include elements and functionality similar to the computer system/server 110 for operation within the network 100 (or 200) (FIGS. 1 and 2).

The computer system/server 110 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown).

The system memory 28 may include at least one program product 40 having a set of program modules 42 that are configured to carry out the functions of embodiments of the subject technology. The program product/utility 40, having a set (at least one) of program modules 42, may be stored in the system memory 28, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, the program modules 42 may carry out the steps for re-routing data connections, processing data feedback from sensors, providing a display output of data feedback, and processing command signals for operating wired or wireless control devices.

The computer system/server 110 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon. Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart (s) and/or block diagram block or blocks.

The word "exemplary" is used herein to mean "serving as an example or illustration." Any aspect or design described herein as "exemplary" is not necessarily to be construed as preferred or advantageous over other aspects or designs.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A network for monitoring and controlling agricultural operations, comprising:
   a server;
   a router coupled to the server;
   a gateway access point coupled to the router;
   a plurality of remote access points coupled to the gateway access point and connected to one another in a wireless mesh; and
   at least one sensor connected to a first of the plurality of remote access points and configured to provide feedback data related to an agricultural field located remotely from the server, the feedback data being provided through a wireless mesh networking specification standard,
   wherein the mesh networking specification standard is IEEE 802.11s,
   wherein at least one of the remote access points is physically connected to a first mobile control device configured to move over at least a portion of the agricultural field.

2. The network of claim 1, further comprising a client access point to access the plurality of remote access points, the client access point using a specification standard selected from one or more of IEEE 802.11a, IEEE 802.11b, IEEE 802.11g, IEEE 802.11n, or IEEE 802.11ac.

3. The network of claim 1, wherein the at least one sensor is a wireless sensor.

4. The network of claim 1, further comprising a web browser interface connectable to the first of the plurality of remote access points.

5. The network of claim 1, further comprising an internet connection between the server and the router.

6. The network of claim 5, further comprising a web browser interface to the internet connection, the web browser interface providing access to the feedback data.

7. A network for monitoring and controlling agricultural operations, comprising:
   a server;
   a router coupled to the server;
   a gateway access point coupled to the router;
   a plurality of remote access points coupled to the gateway access point and connected to one another in a wireless mesh under the IEEE 802.11s standard; and
   at least one wireless sensor connected to a first of the plurality of remote access points and configured to provide feedback data related to an agricultural field located remotely from the server, the feedback data being provided through the wireless mesh under the IEEE 802.11s standard,
   wherein at least one of the remote access points is physically connected to a first mobile control device comprising GPS functionality, and at least another of the remote access points is physically connected to a second mobile control device comprising GPS functionality.

8. The network of claim 1, wherein the first mobile control device comprises an onboard controller configured to: receive instructions related to an action to be taken with respect to the agricultural field, the instructions being received through the wireless mesh networking specification standard; and cause the first mobile control device to perform the action in response to receiving the instructions.

9. The network of claim 8, wherein the instructions are based on the feedback data provided by the at least one sensor.

10. The network of claim 9, wherein the instructions relate to at least one of: seeding the agricultural field, spraying the agricultural field, and harvesting the agricultural field.

11. The network of claim 8, wherein the first mobile control device is a self-driving vehicle.

12. The network of claim 8, wherein at least another of the remote access point is physically connected to a second mobile control device configured to move over at least a portion of the agricultural field, wherein the second mobile control device comprises an onboard controller configured to: receive instructions related to an action to be taken with respect to the agricultural field, the instructions being received through the wireless mesh networking specification standard; and cause the second mobile control device to perform the action in response to receiving the instructions.

13. The network of claim 12, wherein the first mobile control device and/or the second mobile control device is an unmanned, self-driving vehicle.

14. The network of claim 1, wherein the at least one sensor is a wireless sensor, and wherein the network further comprises at least another sensor connected to the first plurality of remote access points and/or a second of the plurality of remote access points, the at least another sensor being configured to provide feedback data related to a second agricultural field located remotely from the server.

15. The network of claim 1, wherein at least one of the remote access points is physically connected to a grain dryer, the grain dryer being configured to receive a command signal via the mesh networking specification standard to effectuate operation of the grain dryer.

16. The network of claim 7, wherein the first mobile control device and/or the second mobile control device is an unmanned, self-driving vehicle.

17. The network of claim 7, wherein the first mobile control device is configured to: receive instructions related to a first action to be taken with respect to the agricultural field, the instructions being received through the wireless mesh under the IEEE 802.11s standard; and cause the first mobile control device to perform the first action in response to receiving the instructions, and wherein the second mobile control device is configured to: receive instructions related to a second action to be taken with respect to the agricultural field, the instructions being received through the wireless mesh under the IEEE 802.11s standard; and cause the second mobile control device to perform the second action in response to receiving the instructions.

18. A method, comprising:
   collecting, at a mobile control device, data relating to an agricultural field;
   sending the data to a server located remotely from the agricultural field via a wireless mesh network based on the IEEE 802.11s standard;

receiving instructions related to an action to be taken with respect to the agricultural field via the IEEE 802.11s wireless mesh network; and performing the action in response to receiving the instructions, wherein the IEEE 802.11s wireless mesh network comprises: the server and a plurality of remote access points operatively coupled to one another and to the server, at least one of the remote access points being physically connected to the mobile control device.

19. The method of claim 18, wherein the mobile control device is a self-driving vehicle.

20. The method of claim 18, wherein the mobile control device is configured to move over at least a portion of the agricultural field.

* * * * *